United States Patent [19]

Hara

[11] Patent Number: 4,890,509
[45] Date of Patent: Jan. 2, 1990

[54] TRANSFER UNIT FOR FOUR WHEEL DRIVE AUTOMOTIVE VEHICLE DRIVE TRAIN

[75] Inventor: Tomoyuki Hara, Hadano, Japan

[73] Assignee: Nissan Motor Company, Ltd., Yokohama, Japan

[21] Appl. No.: 196,334

[22] Filed: May 18, 1988

[30] Foreign Application Priority Data

May 27, 1987 [JP] Japan .................. 62-130196

[51] Int. Cl.⁴ .......................... F16H 1/44.5
[52] U.S. Cl. ...................... 74/710.5; 74/714; 180/24
[58] Field of Search ............. 74/665 GA, 665 T, 710, 74/710.5, 714, 740, 701, 705; 180/247, 248, 249, 250

[56] References Cited

U.S. PATENT DOCUMENTS

| | | | |
|---|---|---|---|
| 4,582,159 | 4/1986 | Suzuki | 74/740 X |
| 4,605,087 | 8/1986 | Ashauer et al. | 180/248 |
| 4,609,064 | 9/1986 | Suzuki et al. | 180/247 X |
| 4,677,875 | 7/1987 | Batchelor | 180/248 X |
| 4,722,246 | 2/1988 | Gaus et al. | 74/705 |
| 4,747,464 | 5/1988 | Lanzer | 180/248 |
| 4,757,727 | 7/1988 | Terooka et al. | 74/714 X |
| 4,768,399 | 9/1988 | Kubo et al. | 180/249 X |
| 4,771,653 | 9/1988 | Teraoka | 74/710.5 |
| 4,774,854 | 10/1988 | Ida | 180/249 X |
| 4,776,421 | 10/1988 | Kashihara | 180/249 X |

FOREIGN PATENT DOCUMENTS

| | | | |
|---|---|---|---|
| 61-138226 | 2/1986 | Japan . | |
| 13822 | 1/1988 | Japan | 180/248 |
| 17119 | 1/1988 | Japan | 180/249 |

*Primary Examiner*—Dwight G. Diehl
*Attorney, Agent, or Firm*—Lowe, Price, LeBlanc, Becker & Shur

[57] ABSTRACT

A gear arrangement capable of producing a differential effect is combined with a viscous coupling and two other coupling devices in a manner which enables the selective production of three output distribution modes in a vehicle that provides a user optional front, rear or "front plus rear" wheel drive.

11 Claims, 3 Drawing Sheets

4,890,509

TRANSFER UNIT FOR FOUR WHEEL DRIVE AUTOMOTIVE VEHICLE DRIVE TRAIN

BACKGROUND OF THE INVENTION

1. Field of the Invention

The present invention relates generally to four wheel drive type vehicles and more specifically to a transfer unit for use in a four wheel drive arrangement which transfer unit permits the torque distribution between the forward and rear wheels to be selectively varied.

2. Description of the Prior Art

FIGS. 1 and 2 show previously proposed transfer gear arrangements for use in four wheel drive vehicles.

In the arrangement shown in FIG. 1 the transfer unit inludes an input shaft 1 which is operatively connected to the engine such as through a clutch and transmission. The input shaft 1 is connected to a forward wheel output shaft 3 by way of a planetary gear unit 2. The planetary gear unit in this instance includes a carrier 2a which is directly connected with the input shaft 1 for synchronous rotation therewith.

The planetary gear further includes a sun gear 2b which is directly connected with the forward wheel output shaft 3 and a ring gear 2c which is connected with a rear wheel output shaft 4 by way of a viscous coupling 5. The input shaft 6 of a differential gear (not comletely shown) is operatively connected with the forward wheel output shaft by way of a drive belt 7.

With this arrangement, the input shaft 1 is operatively connected through the planetary gear unit 2 with rear wheel output shaft 4 and through the planetary gear unit 2 and the viscous coupling 5 to the front wheel output shaft 3. This enables a limited slipe differential gear effect to be established between the forward and rear wheel input shafts 3, 4.

In this arrangement the slip limiting effect is provided by the viscous coupling.

The arrangement shown in FIG. 2 is such that the planetary gear 2 of the above described arrangement is omitted and the input shaft 1 is directly connected to the rear wheel output shaft 4 and the drive connection between the input shaft 1 and the front wheel output shaft 3 established by the viscous coupling alone.

With this latter mentioned arrangement while there is no center differential change effect provided between the input shaft 1 and the front and rear wheel output shafts 3 and 4, the amount of output directed to the front wheel output shaft is limited by the effect of the viscous coupling 5.

However, both of these arrangements have suffered from the drawbacks that the differential effect between the front and rear wheels cannot be removed and the output distribution between the front and rear wheels is specified by the construction of the transfer unit.

Therefore it is not possible with the above arrangements change the mode in which the engine output is distributed in accordance with the surface conditions of the road upon which the vehicle is travelling.

In order to overcome these problems it was proposed in JP-A No. 61-38226 to utilize a multi-plate clutch controlled by a device which allows a controlled amount of slip to occur. However, this arrangement suffered from the problems that the slip control arrangement was expensive and unduly increased the complexity of the arrangement.

SUMMARY OF THE INVENTION

It is an object of the present invention to provide a transfer unit for a four wheel drive vehicle which is simple and inexpensive and which can allow the distribution of output to the front and rear wheels to be selectively controlled in accordance with road surface conditions.

In brief, the above object is achieved by an arrangement wherein a gear arrangement capable of producing a differential effect is combined with a viscous coupling and two other coupling devices in a manner which enables the selective production of a number of different output distribution modes.

More specifically, the present invention comes in the form of a transfer unit which features: a first output shaft; differential gear means, the differential gear means having first, second and third elements; a viscous coupling, the viscous coupling being operatively interconnecting the first output shaft and the first element of the differential gear; a first selectively operable coupling device, the first coupling being operatively disposed between the first output shaft and the second element of the differential gear, the first coupling device being arranged to provide a drive connection between the first output shaft and the second element of the differential gear; a second selectively operable coupling device, the second coupling device being disposed between the first and third elements of the differential gear, the second coupling device being arranged to provide a drive connection between the first and third elements when engaged; an input shaft, the input shaft being connected to one of the first and second input elements of the differential gear; and a second output shaft, the second output shaft being connected with one of the first and second elements of the differential gear.

DETAILED DESCRIPTION OF THE PREFERRED EMBODIMENTS

Figure 1:
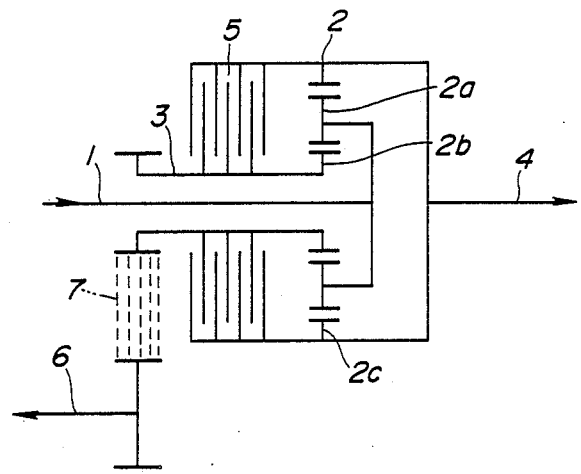
FIGS. 1 and 2 are schematic elevations which show the prior art arrangements discussed in the opening paragraphs of the instant disclosure.
Figure 3:
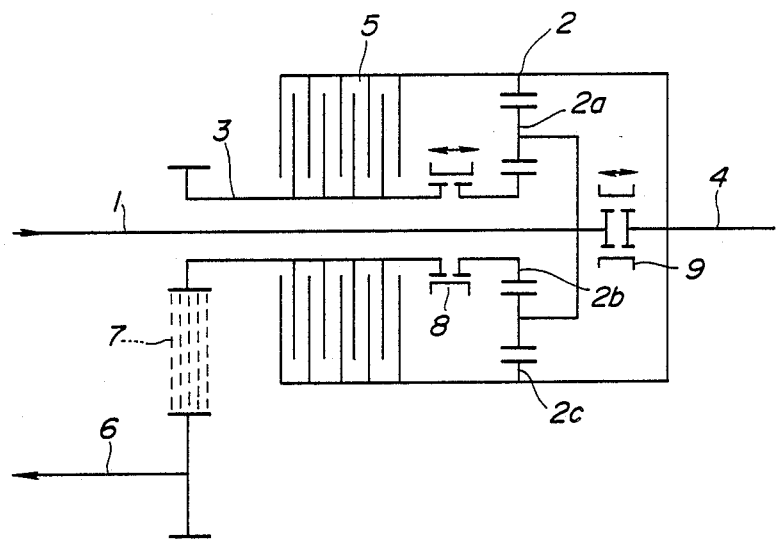
FIG. 3 is schematic elevation of first embodiment of the present invention.

FIG. 3 shows a first embodiment of the present invention. In this arrangement the input shaft 1 of the transfer unit is, similar to the arrangement disclosed in connection with FIG. 1, connected to the vehicle engine through a suitable clutch and transmission arrangement or the like, at one end and to the carrier 2a of a planetary gear 2 at the other end.

The sun gear 2b is selectively connectable by way of a coupling sleeve 8 to the front wheel output shaft 3.

In this arrangement the front wheel output shaft 3 is hollow and arranged coaxially about the input shaft 1.

The front wheel output shaft 3 is also supported in a manner which permits it to be independently rotatable with respect to the input shaft 1.

The ring gear 2c of the planetary gear set 2 is connected to both the rear wheel output shaft 4 and to hollow front wheel output shaft 3 by way of a viscous coupling 5. In addition to this the input shaft 1 is selectively connectable to the rear wheel output shaft 4 by way of a coupling sleeve 9.

The above mentioned coupling sleeves 8 and 9 define first and second selective coupling or clutching arrangements which can be selectively engaged in a manner to provide drive connections of a nature which will be discussed in more detail hereinlater. It will be noted that the devices are not limited to coupling sleeves and hydraulically operated multi-plate clutches or the like can be used as desired.

In this instance the front wheel output shaft 3 is with the input shaft 6 of of the front wheel differential gear by a belt 7.

The operation of the above described arrangment is such that when the first coupling arrangement, i.e., coupling sleeve 8 is conditioned to provide a drive connection and the second coupling arrangement coupling sleeve 9 is disengaged, i.e., produces no drive connection, the input from the input shaft 1 is transmitted via the planetary gear 2 and the viscous coupling 5 to the front wheel output shaft 3, and via the planetary gear 2 to the rear wheel output shaft 4.

Figures 4A, 4B, 4C:
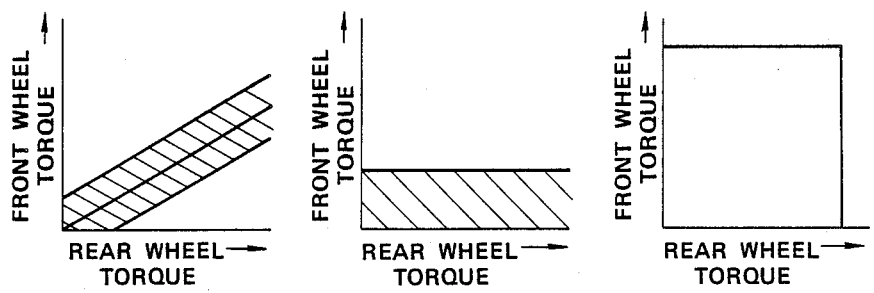
FIGS. 4A–4C are graphs showing the operational characteristics provided by the three modes possible with the arrangement shown in FIG. 3.

Under these conditions the viscous coupling 5 provides a center differential function which in combination with the viscous coupling 5 produce operational characteristics of the nature shown in FIG. 4A. As will be appreciated, these characteristics are essentially similar to those produced by the arrangement disclosed in FIG. 1.

Figure 2:
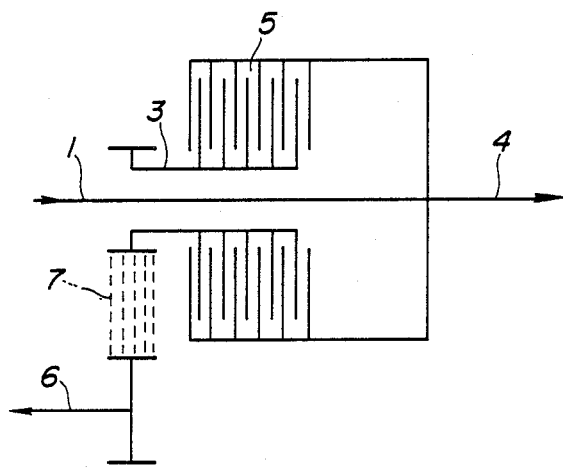

When the second coupling arrangement, i.e., coupling sleeve 9 is engaged and the first coupling sleeve 8 is disengaged, the input shaft 1 becomes directly connected with the rear wheel output shaft 4 and a situation similar to that in the arrangement shown in FIG. 2 is produced. Under these conditions the characteristics shown in FIG. 4B are produced. As will be noted, there is no center differential function produced and the amount of output which is directed to the forward wheels through the front wheel output shaft 3 is limited to a predetermined maximum value.

When both of the first and second coupling arrangements are engaged the input shaft 1 and the rear wheel output shaft 4 become directly connected while the ring gear 2c and the carriers 2a of the planetary gear set 2 are induced to rotate in unison. Under these conditions the sun gear 2b is induced to rotate at the same speed as the input shaft 1. Accordingly, the input shaft 1, forward wheel output shaft 3 and rear wheel output shaft 4 all rotate synchronously. With the transfer unit so conditioned, the center differential action is prevented and the characteristics shown in FIG. 4C are produced.

Figure 5:
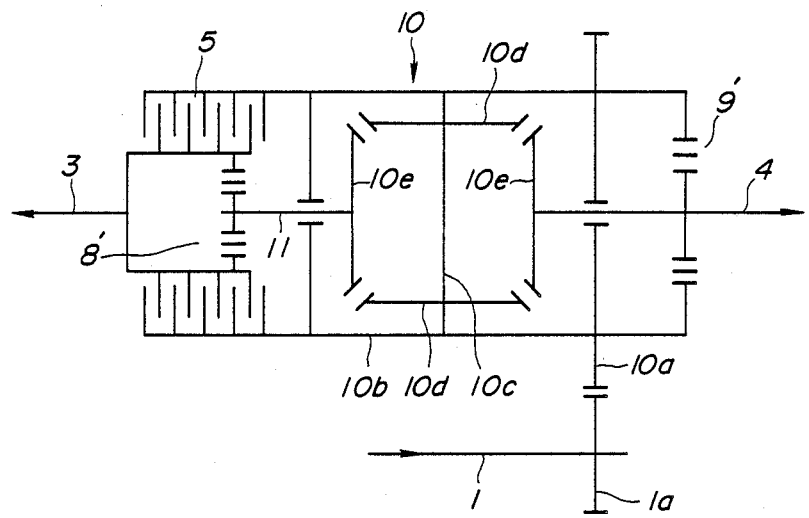
FIG. 5 shows a second embodiment of the present invention.

FIG. 5 shows a second embodiment of the present invention. In this arrangement a differential gear unit 10 is used in place of the planetary gear set. As shown the input shaft 1 is provided with a gear 1a which meshes with the ring gear 10a of the differential unit 10. The ring gear 10a is connected with the differential case 10b for synchronous rotation acts as the input element for the tranfer unit. Pinions 10d are mounted on pinion shafts 10c. Side gears 10e are arranged to cooperate with the pinions 10d in a well known manner. One of the side gears 10e is mounted on the rear wheel output shaft 4 while the other is connected by way of an intermediate shaft 11, and a first selectively engageable multi-plate hydraulically operated friction element 8' to the front wheel output shaft 3.

A second multi-plate hydraulically operated friction element 9' is arranged to selectively provide a drive connection between the diferential case 10b and the rear wheel output shaft 4.

The operation of this arrangement is essentially similar to that of the first embodiment. However should be noted that with this embodiment is is possible to reverse the roles of the forward wheel and rear wheel output shafts 3 and 4.

The various other modes and ways in which the above disclosed embodiments can be used will be obvious to those skilled in the art to which the instant invention pertains. The various modifications which can be made without departing from the scope of the present invention are also deemed apparent to said skilled personnel and are considered to be comprehended within the claims appended hereinbelow.

What is claimed is:

1. A transfer unit, suitable for a four wheel vehicle drive train, comprising:
    a first output shaft;
    a differential gear means, said differential gear means having first, second and third elements;
    a viscous coupling, said viscous coupling operatively interconnecting said first output shaft and the first element of said differential gear;
    a first selectively operable coupling device, said first coupling device being operatively disposed between said first output shaft and the second element of said differential gear, said first coupling device being arranged to provide a drive connection between said first output shaft and the second element of said differential gear;
    a second selectively operable coupling device, said second coupling device being disposed between the first and third elements of said differential gear, said second coupling device being arranged to provide a drive connection between said first and third elements when engaged;
    an input shaft, said input shaft being connected to one of said first and third elements of said differential gear; and
    a second output shaft, said second output shaft being continuously connected with one of said first and third element and selectively connectable with the other of said first and third elements.

2. A transfer unit as claimed in claim 1, wherein:
    said first and second coupling devices comprise coupling sleeves.

3. A transfer unit as claimed in claim 1, wherein:
    said first and second coupling devices comprise hydraulically operated clutches.

4. A transfer unit as claimed in claim 1, wherein :
    said first input shaft is connected to the third element of said differential gear and the second output shaft is continuously connected to the first element of said differential gear and selectively connectable with said third element by engagement of said second coupling device.

5. A transfer unit as claimed in claim 4, wherein:
    said differential gear comprises a planetary gear set wherein said first element is a ring gear, said second element is a sun gear, and said third element is a pinion carrier.

6. A transfer unit as claimed in claim 5, wherein:
    said input shaft is directly connected to said pinion carrier and wherein said first output shaft is hollow, and wherein said input shaft is disposed through said hollow first output shaft.

7. A transfer unit as claimed in claim 1, wherein:
said input shaft is operatively connected with the first element of said differential gear, and the second output shaft is continuously connected to the third element of said differential gear and is selectively connectable with the first element of said differential gear by engagement of said second coupling device.

8. A transfer unit as claimed in claim 7, wherein:
said differential gear comprises a differential gear unit wherein said first element is the case of the differential gear unit, and the second and third elements are first and second side gears, said first and second side gears being operatively connected with said case through pinions which are rotatably supported on said case.

9. A transfer unit as claimed in claim 7, wherein:
said input shaft has an input gear attached thereto, and wherein said input gear meshes with a ring gear fixed to said case.

10. A transfer unit, comprising:
a first output shaft;
a differential gear means comprising a ring gear, a sun gear and a carrier on which pinion gears are carried, said pinion gears providing an operative connection between said sun and ring gears;
a viscous coupling, said viscous coupling operatively interconnecting said first output shaft and said ring gear;
a first selectively operable coupling device, said first coupling device being operatively disposed between said first output shaft and said sun gear, said first coupling device being arranged to provide a drive connection between said first output shaft and said sun gear;
a second selectively operable coupling device, said second coupling device being disposed between said ring gear and said carrier, said second coupling device being arranged to provide a drive connection between said ring gear and said carrier when engaged;
an input shaft, said input shaft being connected to said carrier; and
a second output shaft, said second output shaft being continuously connected with said ring gear and selectively placed drive connection with said carrier when said second coupling device is engaged.

11. A transfer unit comprising:
a first output shaft;
a differential gear means, said differential gear means having first, second and third elements, said first, second and third elements comprising the casing of the differential gear means, and first and second gears being operatively connected with said casing by way of pinions;
a viscous coupling, said viscous coupling operatively interconnecting said first output shaft and said casing;
a first selectively operable coupling device, said first coupling device being operatively disposed between said first output shaft and said first side gear, said first coupling device being arranged to provide a drive connection between said first output shaft and said first side gear when engaged;
a second selectively operable coupling device, said second coupling device being disposed between said casing and said second side gear, said second coupling device being arranged to provide a drive connection between said casing and said second side gear when engaged;
an input shaft, geared to a ring gear formed on said casing; and
a second output shaft that is continuously connected with said second side gear and adapted to be selectively placed in drive connection with said casing.

* * * * *